(12) United States Patent
Buell et al.

(10) Patent No.: US 7,362,240 B2
(45) Date of Patent: Apr. 22, 2008

(54) REPLACEMENT AVIONICS DISPLAY INSTRUMENT

(75) Inventors: Robert K. Buell, Ball Ground, GA (US); Marcus F. Dutton, Canton, GA (US); Gregory L. Leggitt, Duluth, GA (US)

(73) Assignee: L3 Communications Corporation, New York, NY (US)

( * ) Notice: Subject to any disclaimer, the term of this patent is extended or adjusted under 35 U.S.C. 154(b) by 432 days.

(21) Appl. No.: 11/096,534

(22) Filed: Apr. 1, 2005

(65) Prior Publication Data

US 2006/0220916 A1    Oct. 5, 2006

(51) Int. Cl.
*G08B 21/00* (2006.01)
(52) U.S. Cl. .................. 340/945; 340/815.4; 345/7
(58) Field of Classification Search ............... 340/945, 340/815.4, 815.44, 815.53; 345/7; 359/630
See application file for complete search history.

(56) References Cited

U.S. PATENT DOCUMENTS

| 5,995,290 A | * | 11/1999 | Noble | ........................ 359/630 |
| 2005/0143871 A1 | * | 6/2005 | Boorman et al. | .............. 701/3 |
| 2006/0060732 A1 | * | 3/2006 | Tannas, Jr. | ............... 248/205.1 |

* cited by examiner

*Primary Examiner*—Phung T. Nguyen
(74) *Attorney, Agent, or Firm*—Gardner Groff Greenwald & Villanueva PC

(57) ABSTRACT

A solid-state electronic avionics display instrument includes one or more bar-graph-like displays mounted within a housing in a manner that emulates the manner in which prior electro-mechanical indicator mechanisms have been mounted in such housings so as to indicate a value along a vertically readable scale. An aircraft can be retrofitted with such instruments to replace existing electro-mechanical mechanism-based avionics instruments.

14 Claims, 4 Drawing Sheets

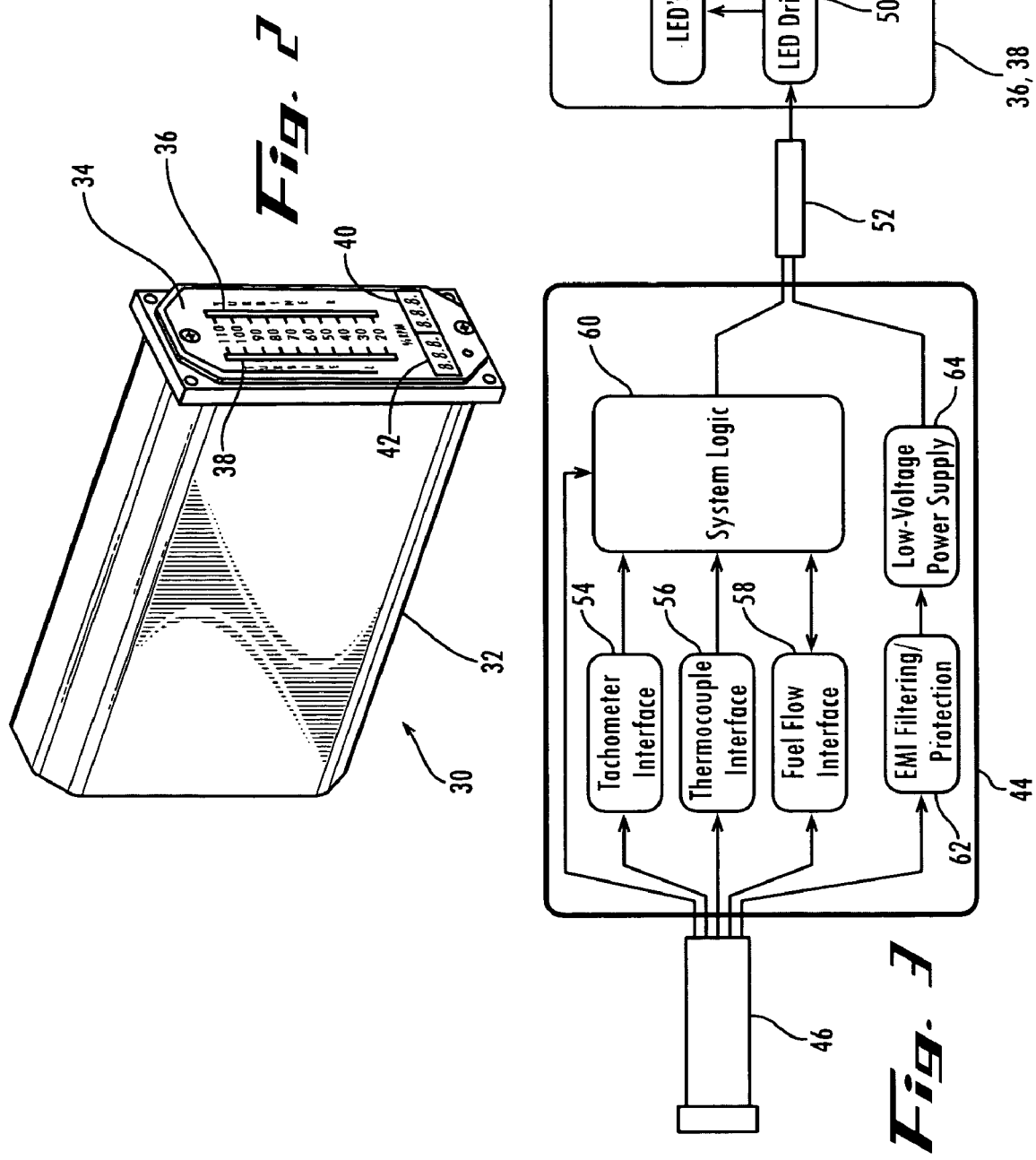

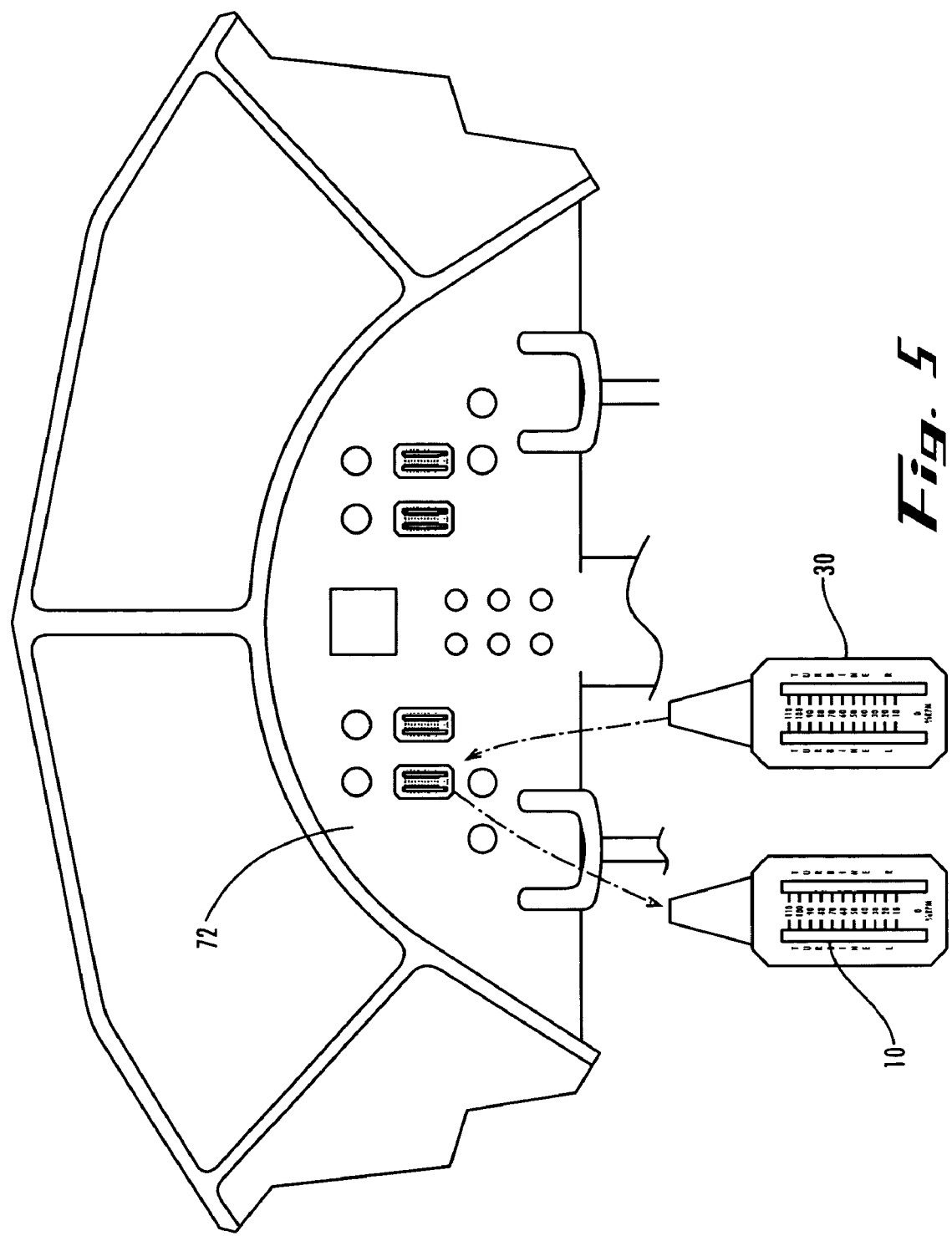

REPLACEMENT AVIONICS DISPLAY INSTRUMENT

BACKGROUND OF THE INVENTION

1. Field of the Invention

The present invention relates generally to avionics instrumentation and, more specifically, to retrofitting existing instruments and aircraft with electronic display-based instruments.

2. Description of the Related Art

Aircraft cockpit flight instrumentation (avionics) indicators may employ a variety of mechanisms, including vertical scale indicator mechanisms, radial dial indicator mechanisms, and pivoting mechanisms, such as those of compasses and attitude gyro indicators.

Many avionics indicators have long been entirely electro-mechanical, with needle pointers, rotating wheels, bands, spheres and so forth moving over or within a fixed dial or housing. For example, a vertical scale indicator that is used to indicate fuel flow commonly has an elongated rectangular housing, with a fuel flow scale printed numerically along its length, and a pointer band that moves lengthwise alongside the scale to indicate the current fuel flow. The instrument is mounted vertically on the cockpit instrumentation panel such that the pointer band appears to move or extend vertically. A pilot can thus determine at a glance that fuel flow is lower when the pointer band is shorter and higher when the pointer band is longer. A pilot can read the exact fuel flow by noting the point on the scale to which the pointer band extends.

Although fully solid-state display-based technologies, such as multi-function display instruments, have begun to supplant electro-mechanical indicators in commercial and military aircraft, general aviation (i.e., small private aircraft) pilots and regulatory authorities have been slower to accept such changes. General aviation pilots are generally accustomed to mechanical vertical scale indicators, radial dial indicators, attitude indicators and so forth. For example, in older CESSNA CITATION aircraft, electro-mechanical vertical scale indicators are used to indicate fuel flow, inter-turbine temperature, fan speed and turbine speed. It would be desirable to retrofit such older aircraft with solid-state electronic display-based instruments, but retrofitting with the latest multi-function display instruments is impractical and costly because their form factors differ greatly from those of the original instruments, and it can be difficult to obtain approval from regulatory authorities.

Accordingly, it can be seen that a need yet exists for a method and apparatus to replace existing electro-mechanical avionics display instruments, while allowing the replacement instrument to be fitted within the existing openings of the aircraft. It is to the provision of such a method and apparatus that the present invention is primarily directed.

SUMMARY OF THE INVENTION

Briefly described, in a first preferred form the present invention comprises a replacement avionics display instrument for use in existing aircraft to replace an instrument having an electro-mechanical display. The replacement avionics display instrument comprises an avionics housing either removed from such an aircraft or constructed to replicate the same. If the housing is one removed from an aircraft, the existing electro-mechanical display is removed. In place of the electro-mechanical display in the original instrument, an electronic display is substituted in the replacement avionics display instrument. In one form, the electronic display can comprise an LED display. In another form, the electronic display can comprise an LCD display. The replacement avionics display further includes electronic circuitry to allow the electronic display to be driven by the electrical input signals formerly (normally) driving the electro-mechanical display. In other words, the replacement avionics display can be connected to the electrical inputs of the aircraft and installed in the existing opening in the aircraft without requiring any modification to the aircraft. Advantageously, this allows modern instrument technology to be retrofitted into older aircraft in a simple, direct and relatively inexpensive manner.

As described above, one way to accomplish this is to re-use the old avionics instrument housing. Alternatively, a reasonable facsimile of the housing could be fabricated and used instead of the old housing. Such might be preferable in situations where the old housing is damaged, corroded, etc.

One ready application for such a hybrid or replacement instrument is to replace electro-mechanical vertical scale indicator instruments. These are particularly attractive targets for such a replacement instrument due to the relatively high cost of repairing or replacing the electro-mechanical vertical scale indicator movements contained within the instrument.

In another preferred form the invention comprises a solid-state electronic avionics vertical scale indicator that includes one or more bar-graph-like displays mounted within a housing in a manner that emulates the manner in which prior electro-mechanical vertical scale indicator mechanisms have been mounted in such housings so as to indicate a value along a vertically readable scale. Solid-state displays are not only more reliable than electro-mechanical mechanisms but also are easier for pilots to read because they are generally clearer and brighter. Electronic circuitry in the housing interfaces the display with input signals received from aircraft sensors of the type commonly included in general-aviation aircraft, such as fuel flow sensors, inter-turbine temperature sensors, fan speed sensors, turbine speed sensors, etc. Indeed, in one aspect of the invention, existing vertical scale indicators that have been installed in such aircraft or that are intended for installation in such aircraft can be retrofitted to replace their electro-mechanical mechanisms with electronic bar-graph displays. Retrofitting such indicators in this manner or, alternatively, providing new indicators that otherwise appear identical to those that have long been used in general-aviation aircraft but for employing electronic bar-graph displays instead of electro-mechanical mechanisms, is economical and promotes pilot confidence and the acceptance of such replacement indicators by regulatory authorities.

In another form, the present invention comprises a method of retrofitting avionic display instruments, the avionics display instrument being of the type having a housing containing an electro-mechanical movement adapted to be driven by electrical input signals from an aircraft to which the avionics display instrument is mounted. The method includes the steps of removing the avionics display instrument from the aircraft and removing the electro-mechanical movement from the housing of the avionics display instrument. The method also includes the step of mounting an electronic display in the housing in place of the electro-mechanical movement, the solid state electronic display being adapted to be driven by the same electrical input signals as the original avionics display instrument. The method also includes the step of remounting the avionics display instrument in the aircraft.

BRIEF DESCRIPTION OF THE DRAWINGS

FIG. 2 is a perspective view of a replacement avionics display instrument, in particular in the optional form of a vertical scale indicator having a solid-state bar-graph display.

FIG. 3 is a schematic block diagram of the replacement avionics display instrument of FIG. 2.

FIG. 5 is a schematic illustration depicting retrofitting an aircraft cockpit to replace electro-mechanical mechanism-based vertical scale indicators with electronic display-based vertical scale indicators.

DETAILED DESCRIPTION

Figure 1:
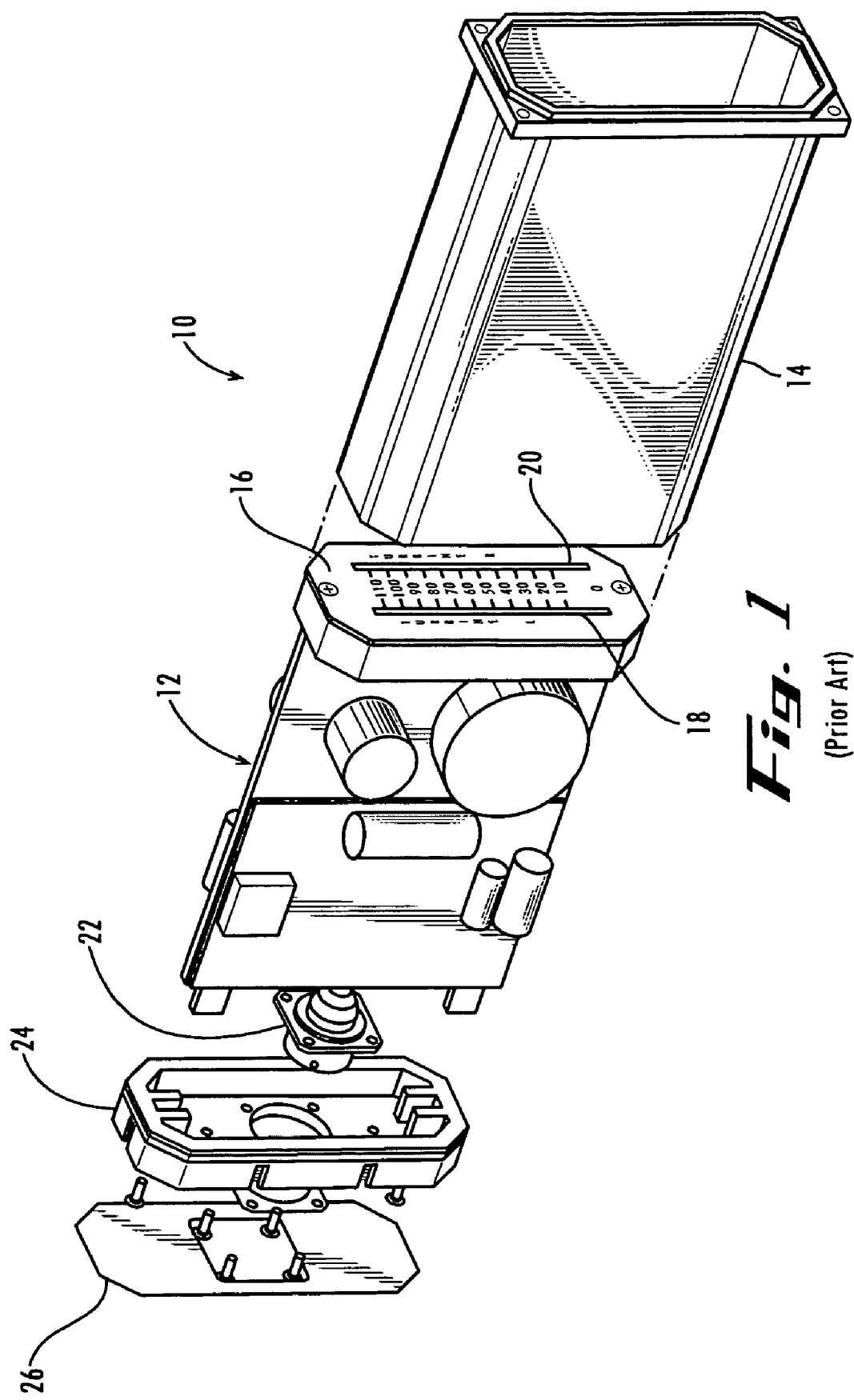
FIG. 1 is an exploded perspective view of a prior art electro-mechanical display instrument, here illustrated as a vertical scale indicator having an electro-mechanical indicator mechanism, and depicting removal of the mechanism-based assembly from the housing.

In the following description, like reference numerals indicate like components to enhance the understanding of the invention through the description of the drawings. Also, although specific features, configurations and arrangements are discussed below, it should be understood that such is done for illustrative purposes only. A person skilled in the relevant art will recognize that other steps, configurations and arrangements are useful without departing from the spirit and scope of the invention.

FIG. 1 illustrates the internal structure of a conventional vertical scale indicator 10 that includes an electro-mechanical assembly 12 and a housing 14. Electro-mechanical assembly 12 has a faceplate 16 in which two electro-mechanical indicator movements or mechanisms 18 and 20 are mounted and readable against two respective scales printed on faceplate 16. For example, the scales may indicate percent of full turbine speed (RPM) of left and right engines, respectively, of an aircraft (not shown) in which indicator 10 is intended to be mounted (or from which indicator 10 has been removed). Note that the scales are "vertical" in the sense that they are vertically readable by a pilot seated in an aircraft cockpit (not shown) in which indicator 10 would be installed.

A cable assembly 22 receives input signals from one or more avionics sensors (not shown) when indicator 10 is installed in an aircraft. Cable assembly 22 is mounted to electro-mechanical assembly 12 with a bracket 24, a backplate 26, and suitable screws or other fasteners (not shown for purposes of clarity), and the internal structure as a whole is secured within housing 14 with suitable fasteners other by other suitable means.

As well-known in the art, and therefore not described in detail herein, indicator mechanisms 18 and 20 include various spools and rollers, through which tape-like pointer bands are threaded, and servo motors and associated controller electronics that move the bands with respect to the printed scales in accordance with the input signals. It is such an electro-mechanical indicator system that the solid-state electronic system of the present invention is intended to replace.

As illustrated in FIG. 2, an electronic display-based vertical scale indicator 30 in accordance with the present invention has a housing 32 and a faceplate 34 in which two electronic bar-graph displays 36 and 38 are mounted and readable against two respective scales printed on faceplate 34. For reasons discussed in further detail below, housing 32 can be that of an existing indicator 10 (FIG. 1) or it can be a replica of such a housing. In the embodiment of the invention illustrated in FIG. 2, the scales indicate percent of full turbine speed (RPM) of left and right engines, respectively, of the aircraft in which indicator 30 is installed or intended to be installed. Nevertheless, such scales are merely exemplary; in other embodiments, the scales may be printed with indicia suitable for whatever quantity the indicator is intended to display, such as fuel flow, inter-turbine temperature, and so forth.

In addition to displays 36 and 38, which are the primary indicating means, indicator 30 includes, as secondary indicating means, two digital displays 40 and 42 that numerically display the same quantity represented by bar-graph displays 36 and 38, respectively. In embodiments of the invention in which digital displays 40 and 42 are included, a pilot can choose to read either type of display according to his or her preference. Many pilots are accustomed to vertical scale indicators that are similar in appearance and function to the primary means illustrated in FIG. 1 and therefore may prefer to read displays 36 and 38.

The term "bar-graph display" refers, for purposes of this invention, to any elongated or bar-like solid-state electronic display, whether comprising LED's, LCD's or other display technology, in which a selectable length or bar can be displayed. In the illustrated embodiment of the invention, the display is of the LED type, in which there are multiple LED's linearly arrayed adjacent to one another. The more LED's that are activated, the longer the bar appears. Thus, when the interface circuitry receives an input signal from an aircraft sensor, such as an engine tachometer, it activates a number of adjacent LED's that is proportional to the engine speed represented by the input signal.

As illustrated in FIG. 3, indicator 30 includes interface electronics 44 that receive input signals from one or more avionics sensors (not shown) via a suitable cable assembly 46. Displays 36 and 38 each comprise the LED's 48 themselves and suitable driver circuits 50. Although in the illustrated embodiment another short cable 52 couples interface electronics 44 to displays 36 and 38, in other embodiments the various components or elements may be mounted on the same circuit card or assembly as that of interface electronics 44 or mounted or assembled in any other suitable configuration.

Although the elements of interface electronics 44 will depend upon the indicator type that is embodied, they may include any of the following: a tachometer interface 54, a thermocouple interface 56 and a fuel flow interface 58. In addition, interface electronics 44 may include suitable system logic 60 as well as EMI filtering/protection circuitry 62 and a low-voltage power supply 64. Persons skilled in the art to which the invention relates will readily be capable of designing suitable interface electronics 44 for any of the conventional vertical scale indicator types, such as inter-turbine temperature indicators, turbine fan speed indicators, fuel flow indicators, and so forth.

Figure 4:
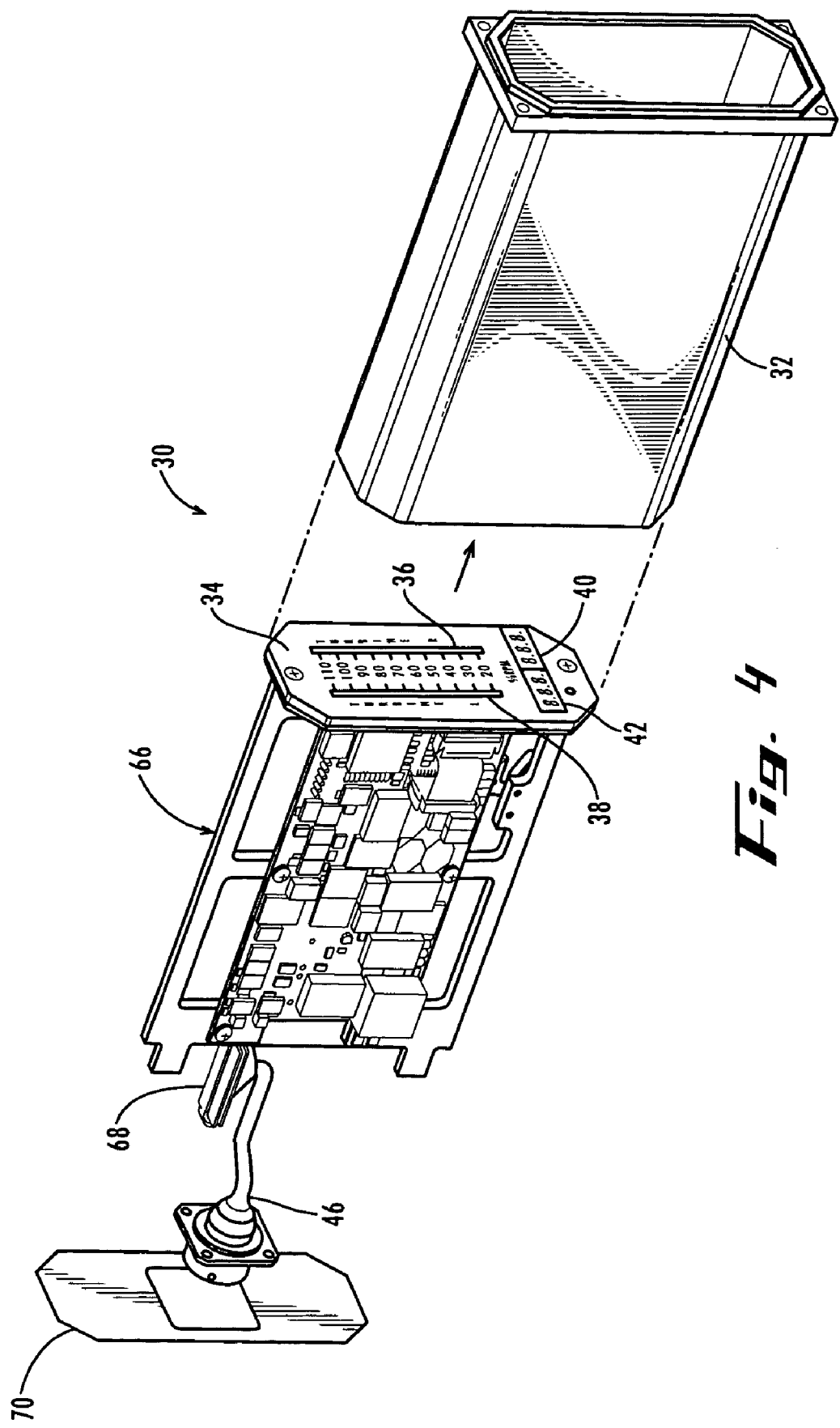
FIG. 4 is an exploded perspective view of the replacement avionics display instrument of FIG. 2, illustrating installation of an electronic display-based assembly into the housing in place of a mechanism-based assembly.

FIG. 4 illustrates the internal structure of vertical scale indicator 30. A feature of the present invention is that avionics display instruments of the present invention have substantially the same form factor as electro-mechanical mechanism-based instruments that have conventionally been used in aircraft. The form factor may be preserved through retrofitting existing housings (i.e., housings of conventional avionics instruments that have been removed from aircraft or that have otherwise already been manufactured) or through providing replica housings. Thus, housing 32 may, in the case of retrofitting, be housing 14 (FIG. 1) from which electro-mechanical indicator mechanisms 18 and 20 and the rest of electro-mechanical assembly 12 have been removed or, in other cases, may be a replica of housing 14 or other housing of conventional design.

Vertical scale indicator 30 further includes an electronic assembly 66 on which faceplate 34 and displays 36, 38, 40 and 42 are mounted, as described above with regard to FIG. 1. The electronic components depicted in generalized fashion as part of electronic assembly 66 are those described above with regard to the schematic block diagram of FIG. 3. A data connector 68 is provided for connecting electronic assembly 66 to external equipment (not shown) for diagnostic and configuration purposes. A backplate 70 secures cable assembly 46, and the internal structure as a whole is secured within housing 32 with suitable fasteners or by other suitable means.

In summary, and with reference to FIGS. 1 and 4, in an example of retrofitting an existing electro-mechanical mechanism-based vertical scale indicator, one removes electro-mechanical assembly 12 and its associated bracket 24, backplate 26, and any other mounting hardware from housing 14 and replaces them with electronic assembly 66 and its associated backplate 70 and mounting hardware. In embodiments of the invention in which the physical structures and configurations of the removed and replaced structures differ from those described above with regard to the illustrated embodiment, the retrofitting method is essentially the same with accommodations made for such differences.

As illustrated in FIG. 5, an aircraft cockpit having any number of conventional (electro-mechanical mechanism-based) vertical scale indicators 10 can be retrofitted with electronic display-based indicators 30. Each such existing vertical scale indicator 10 (see FIG. 1) is removed from its opening in the cockpit control panel 72 and replaced in the same opening with an electronic display-based indicator 30 of the present invention. An indicator 30 of the present invention can fit in the same panel opening as a conventional indicator 10 because they have the same form factor. As described above, the indicator 30 that replaces the indicator 10 may even re-use the same housing. Pilots and regulatory authorities will be comfortable with and reassured by the presence of the familiar form factor and appearance of indicator 30. The operation of bar-graph displays 36 and 38 emulates that of electro-mechanical indicator mechanisms 18 and 20 in that the length of the bar or band displayed indicates the quantity measured by the corresponding avionics sensor, but pilots will notice and appreciate that displays 36 and 38 of indicator 30 are clearer, brighter and thus easier to read than indicator mechanisms 18 and 20 of indicator 10.

It should be noted that, although in the illustrated embodiment of the invention the replacement avionics display instrument is a vertical scale indicator 30, in other embodiments a replacement instrument can be provided that replaces any other suitable type of existing electro-mechanical mechanism-based avionics instrument.

It will be apparent to those skilled in the art that various modifications and variations can be made to this invention without departing from the spirit or scope of the invention. Thus, it is intended that the present invention cover the modifications and variations of this invention provided that they come within the scope of the appended claims and their equivalents.

What is claimed is:

1. A replacement avionics display instrument for use in existing aircraft to replace an existing electro-mechanical instrument having an electro-mechanical display, the aircraft having an instrument opening for receiving the electro-mechanical instrument and having electrical connections for supplying electrical signals to the electro-mechanical instrument, the replacement avionics display instrument comprising:
   an avionics housing either removed from such an aircraft or constructed to replicate such a housing, the avionics housing configured to fit in the existing instrument opening;
   an electronic display housed within the housing; and
   electronic circuitry coupled to the electronic display to allow the electronic display to be driven by the electrical input signals of the aircraft, whereby the replacement avionics display can be connected to the electrical inputs of the aircraft and installed in the existing opening in the aircraft.

2. A replacement avionics display instrument as claimed in claim 1 wherein the electronic display comprises an LED display.

3. A replacement avionics display instrument as claimed in claim 1 wherein the electronic display comprises an LCD display.

4. A replacement avionics display instrument as claimed in claim 1 wherein the electronic display comprises at least one bar-graph display.

5. A replacement avionics display instrument for use in existing aircraft to replace an existing electro-mechanical instrument having an electro-mechanical display, the aircraft having an instrument opening for receiving the electro-mechanical instrument and having electrical connections for supplying electrical signals to the electro-mechanical instrument, the replacement avionics display instrument comprising:
   a housing having at least one vertically readable scale;
   at least one bar-graph display mounted in the housing; and
   interface electronics receiving an input signal from an aircraft sensor and activating a length of a bar-graph display proportional to a quantity represented by the input signal.

6. A replacement avionics display instrument as claimed in claim 5, wherein the display comprises a plurality of light-emitting diodes (LEDs).

7. A replacement avionics display instrument as claimed in claim 5, further comprising at least one digital display activated by the interface electronics to numerically display the quantity represented by the input signal.

8. A replacement avionics display instrument as claimed in claim 5, wherein:
   the at least one bar-graph display comprises a first bar-graph display and a second bar-graph display; and
   the interface electronics receives a first input signal from a first aircraft sensor and activates a length of the first bar-graph display proportional to a quantity represented by the first input signal, and receives a second input signal from a second aircraft sensor and activates a length of the second bar-graph display proportional to a quantity represented by the second input signal.

9. A replacement avionics display instrument as claimed in claim 8, further comprising:
 a first digital display activated by the interface electronics to numerically display the quantity represented by the first input signal; and
 a second digital display activated by the interface electronics to numerically display the quantity represented by the second input signal.

10. A method for retrofitting an avionics display instrument to replace an electro-mechanical instrument, the electro-mechanical instrument being of the type having a housing containing an electro-mechanical movement adapted to be driven by electrical input signals from an aircraft to which the electro-mechanical instrument is mounted, the method comprising the steps of:
 removing the electro-mechanical instrument from the aircraft,
 removing the electro-mechanical movement from the housing of the electro-mechanical instrument;
 mounting an electronic display in the housing in place of the electro-mechanical movement, the solid state electronic display being adapted to be driven by the same electrical input signals as the original avionics display instrument; and
 remounting the housing in the aircraft.

11. The method as claimed in claim 10, wherein:
 the step of removing at least one electro-mechanical movement comprises removing a plurality of electro-mechanical indicator mechanisms; and further comprising the step of mounting a plurality of bar-graph displays in the housing, each bar-graph display replacing one of the electro-mechanical indicator mechanisms.

12. The method as claimed in claim 10 wherein the electro-mechanical instrument comprises a vertical scale indicator.

13. The method as claimed in claim 10 wherein the step of mounting an electronic display in the housing comprises mounting an electronic display unit in the housing and mounting a controller circuit in the housing, the controller circuit adapted for driving the electronic display unit in response to the electrical input signals from the aircraft.

14. A method for retrofitting vertical scale indicators of an aircraft, comprising the steps of:
 removing an electro-mechanical mechanism-based vertical scale indicator from the aircraft, the electro-mechanical mechanism-based vertical scale indicator having a housing and an electro-mechanical indicator mechanism; and
 installing an electronic display-based vertical scale indicator in the aircraft in place of the electro-mechanical mechanism-based vertical scale indicator removed from the aircraft, the electronic display-based vertical scale indicator having a housing essentially identical in form to the housing of the electro-mechanical mechanism-based vertical scale indicator and having a bar-graph display instead of the electro-mechanical indicator mechanism, wherein activation of the bar-graph display emulates movement of the electro-mechanical indicator mechanism.

* * * * *